(12) United States Patent
Ruppel et al.

(10) Patent No.: US 7,850,754 B2
(45) Date of Patent: Dec. 14, 2010

(54) DEVICE FOR SEPARATING A GAS-LIQUID MIXTURE, IN PARTICULAR DURING VENTILATION OF A CRANKCASE OF AN INTERNAL COMBUSTION ENGINE

(75) Inventors: Stefan Ruppel, Heidelberg Emmertsgrund (DE); Yakup Özkaya, Kornwestheim (DE)

(73) Assignee: Mahle International GmbH (DE)

( * ) Notice: Subject to any disclaimer, the term of this patent is extended or adjusted under 35 U.S.C. 154(b) by 78 days.

(21) Appl. No.: 12/277,576

(22) Filed: Nov. 25, 2008

(65) Prior Publication Data

US 2009/0288560 A1    Nov. 26, 2009

Related U.S. Application Data

(63) Continuation of application No. PCT/EP2007/055093, filed on May 25, 2007.

(30) Foreign Application Priority Data

May 29, 2006   (DE) .................. 10 2006 024 820

(51) Int. Cl.
*B01D 45/00* (2006.01)
(52) U.S. Cl. .............. 55/435; 55/456; 55/447; 55/315; 55/385.3; 55/DIG. 19; 55/DIG. 14; 55/428; 55/417; 96/408; 96/409; 96/421
(58) Field of Classification Search ............... 55/435, 55/456, 447, 315, 385.3, DIG. 19, DIG. 14, 55/428, 417; 95/408, 409, 421; 123/198 E; 96/408, 409, 421
See application file for complete search history.

(56) References Cited

U.S. PATENT DOCUMENTS 1,679,090 A * 7/1928 Lammert .................. 55/434.4

(Continued)

FOREIGN PATENT DOCUMENTS

DE        2149975        4/1973

(Continued)

OTHER PUBLICATIONS

Machine Translation of JP 09303129.*

(Continued)

*Primary Examiner*—Jason M Greene
*Assistant Examiner*—Dung Bui
(74) *Attorney, Agent, or Firm*—Rader, Fishman & Grauer PLLC

(57) ABSTRACT

A device for separating a gas-liquid mixture, wherein a liquid part is in the form of small particles by separating and coagulating the liquid particles in a separation surface including, at least one region of an inner wall surface of a cyclone, the separation surface comprised of the at least one region; at least one fibre lining material that is formed as one of a knitted fibre and a non-woven fibre with a fibre thickness between about 5 and 500 μm and a porosity between about 60% and about 90% applied to the inner wall; and a plurality of narrow flow chicanes formed by the at least one lining, wherein at least a portion of the inner wall surface of the cyclone passed by the gas-liquid mixture rotating around a cylinder axis comprises the plurality of narrow flow chicanes.

20 Claims, 4 Drawing Sheets

U.S. PATENT DOCUMENTS

Figure 1A:
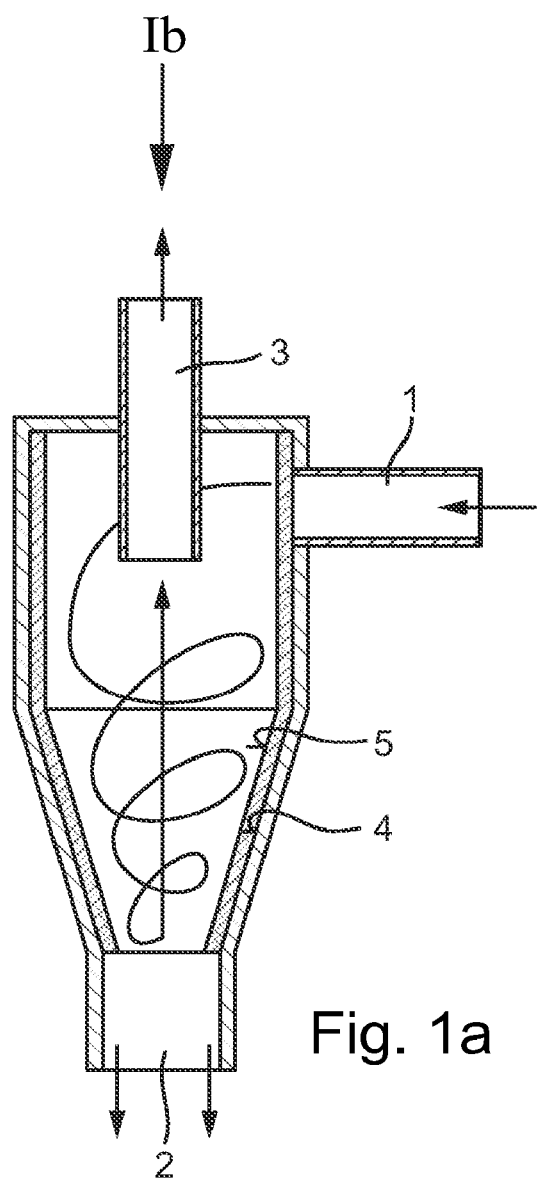

| | | | | |
|---|---|---|---|---|
| 1,922,013 | A * | 8/1933 | Brady | 55/460 |
| 2,758,666 | A * | 8/1956 | Prentiss | 95/70 |
| 3,327,456 | A * | 6/1967 | Guber, Jr. et al. | 55/434.1 |
| 3,379,422 | A * | 4/1968 | Liesenhoff | 261/84 |
| 4,416,672 | A * | 11/1983 | Underwood | 96/213 |
| 4,615,715 | A * | 10/1986 | Seshamani | 55/434.4 |
| 5,693,263 | A * | 12/1997 | Meekel et al. | 261/64.3 |
| 6,290,738 | B1 | 9/2001 | Holm | |
| 2001/0005986 | A1 | 7/2001 | Matsubara et al. | |
| 2003/0150325 | A1 * | 8/2003 | Hyppanen | 95/271 |
| 2003/0172632 | A1 * | 9/2003 | Matsubara et al. | 55/417 |
| 2005/0217224 | A1 * | 10/2005 | Seebach | 55/406 |
| 2005/0279700 | A1 | 12/2005 | Wagner et al. | |
| 2006/0062699 | A1 | 3/2006 | Evenstad et al. | |
| 2006/0090737 | A1 * | 5/2006 | Pietschner | 123/572 |
| 2008/0250772 | A1 * | 10/2008 | Becker et al. | 60/269 |

FOREIGN PATENT DOCUMENTS

| | | |
|---|---|---|
| DE | 3701587 | 11/1987 |
| DE | 4037983 | 6/1992 |
| DE | 10065328 | 4/2001 |
| DE | 102004023813 | 8/2005 |
| DE | 102005043198 | 3/2006 |
| EP | 1068890 | 10/2005 |
| JP | 09177529 A | 7/1997 |
| JP | 01977526 | 8/1997 |
| JP | 09303129 | 11/1997 |
| JP | 10121938 | 5/1998 |
| JP | 11042444 | 2/1999 |
| JP | 11264312 | 9/1999 |

OTHER PUBLICATIONS

Machine Translation of JP 09177529.*
Machine Translation of JP 10121938.*
Machine Translation of JP 11264312.*
English abstract for JP-09177526.
English abstract for JP-11264312.
English abstract for JP-09303129.
English abstract for JP-10121938.
Internet article "Synthetic Non-Woven Fabrics (Viledon Air Filter)".
Wikipedia online "Physikalische Grosse".
International Search Report for PCT/EP2007/055093.
English Abstract provided for JP-9177529.
English abstract provided for DE-1037938.
English abstract for DE-3701587.
English abstract for DE-2149975.
English abstract provided for JP-11042444.

* cited by examiner

Ib

DEVICE FOR SEPARATING A GAS-LIQUID MIXTURE, IN PARTICULAR DURING VENTILATION OF A CRANKCASE OF AN INTERNAL COMBUSTION ENGINE

CROSS-REFERENCES TO RELATED APPLICATION

This application is continuation of International Application No. PCT/EP2007/055093 filed May 25, 2007, which claims priority based on German Patent Application No. DE 10 2006 024 820.1, filed May 29, 2006, both of which are hereby incorporated by reference in their entirety.

The invention relates to a device of a gas-liquid mixture, in particular during ventilation of a crankcase of an internal combustion engine according to the preamble of the patent claim 1.

From EP 1 068 890 B1, a device for separation of a gas-liquid mixture is known, which is formed as a so-called impactor. This concerns a separation device, in which the gas-liquid mixture after acceleration, for example, in a nozzle, impinges on a separation surface, at which a redirection of the flow by at least 60 angular degrees takes place. Due to the inertia by such a redirection of the flow, liquid particles are separated from the mixture. In said known device, the impact surface is formed particularly rough or porous, respectively, for a particularly good degree of separation.

From DE 037 983 A1, for separation of a gas-liquid mixture, a cyclone is known, the inner wall regions of which are exposed to a rotating mixture flow and are lined with a relatively thick foam liner. Such foams have relatively large pores and affect, that is, decelerate, the rotational flow considerably. This applies in particular for thick foam liners, like they are provided there.

The invention is concerned with the problem to develop devices for separation of a gas-liquid mixture, in particular during the ventilation of a crankcase of an internal combustion engine, in which, with an installation size as small as possible and a simple constructive structure of the separation device, a degree of separation as high as possible can be achieved.

This problem is solved primarily by the embodiments of separation devices according to the independent patent claims 1 and 12. These embodiments comprise in particular separation surfaces which are formed, at least partially, rough or porous, and in a manner as they are described in detail, amongst others, in particular in EP 1 068 890 B1.

For the embodiment according to the independent claim 1 and the forms to which hereto sub-claims are directed, it was surprisingly found that a fine-pored, thinner, and particularly fibrous separation surface, as it was found extremely separation-effective for impactors according to, for example, EP 1 068 890 B1, also causes an increase of the degree of separation during use in cyclones. This is surprising for cyclones because here the separation effect depends on a preferably high rotational flow velocity which, in principle, is negatively affected by a rough or porous formation of the surface, as provided, for example, by a thick, relatively large-pored foam according to DE 4 037 983 A1, at which the flow takes place. To have recognized that this is not the case for thin, fine-pored separation surfaces was not expected, and therefore represents an invention.

Advantageous and preferred embodiments of the invention are illustrated in the drawing and are described hereinafter in detail for further explanation.

In the figures

Figure 2:
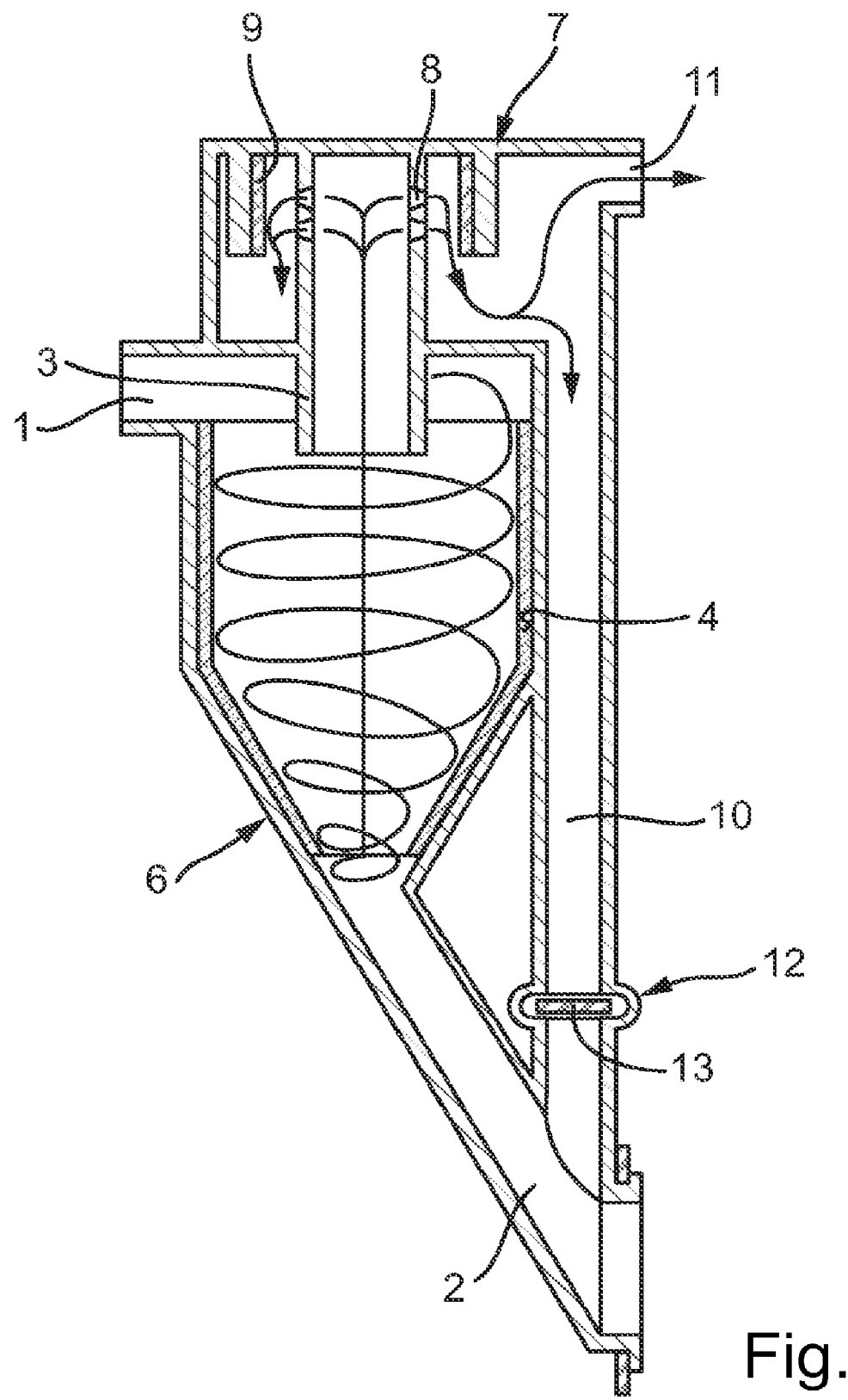
Figure 3:
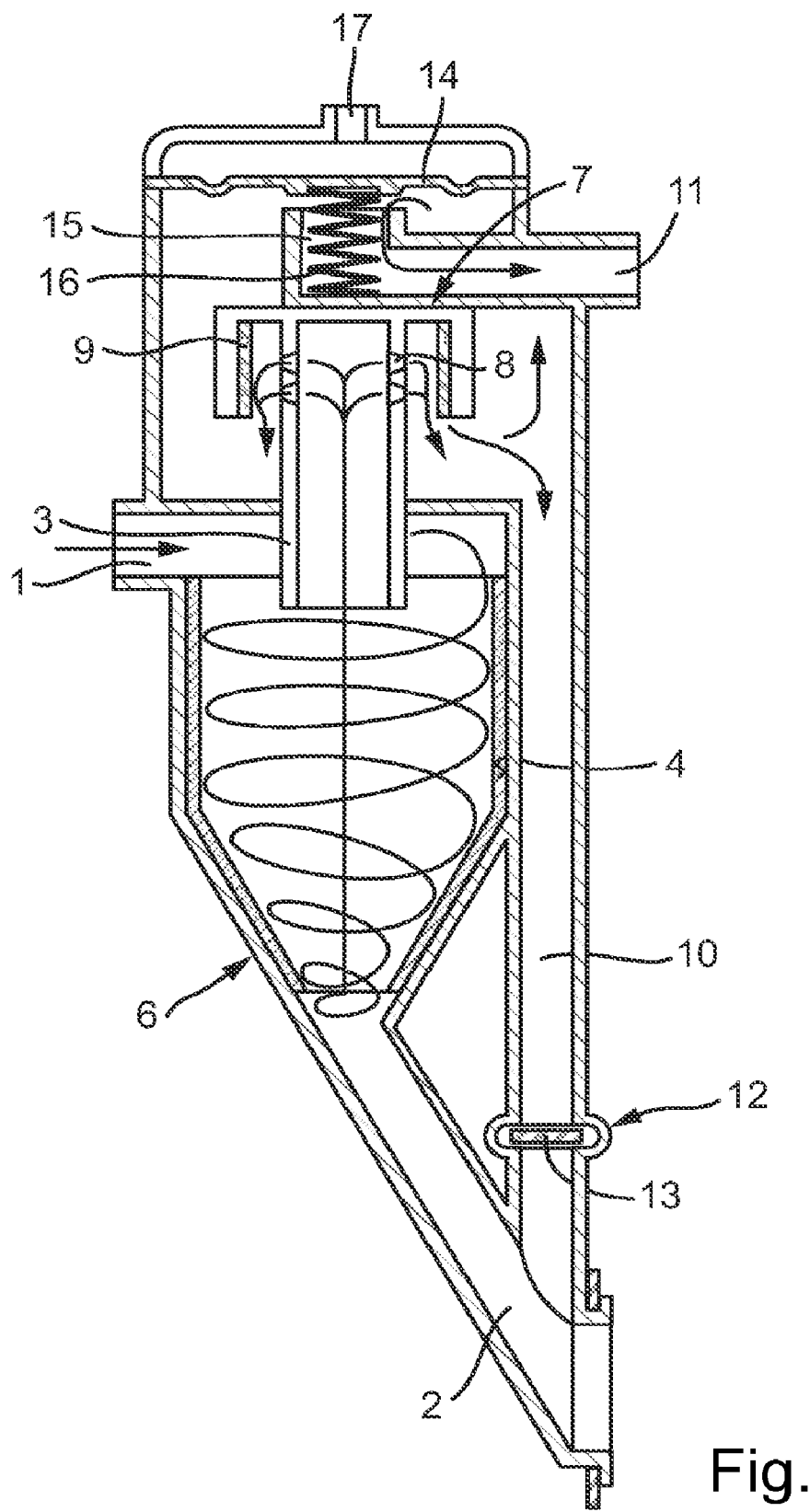
Figure 4:
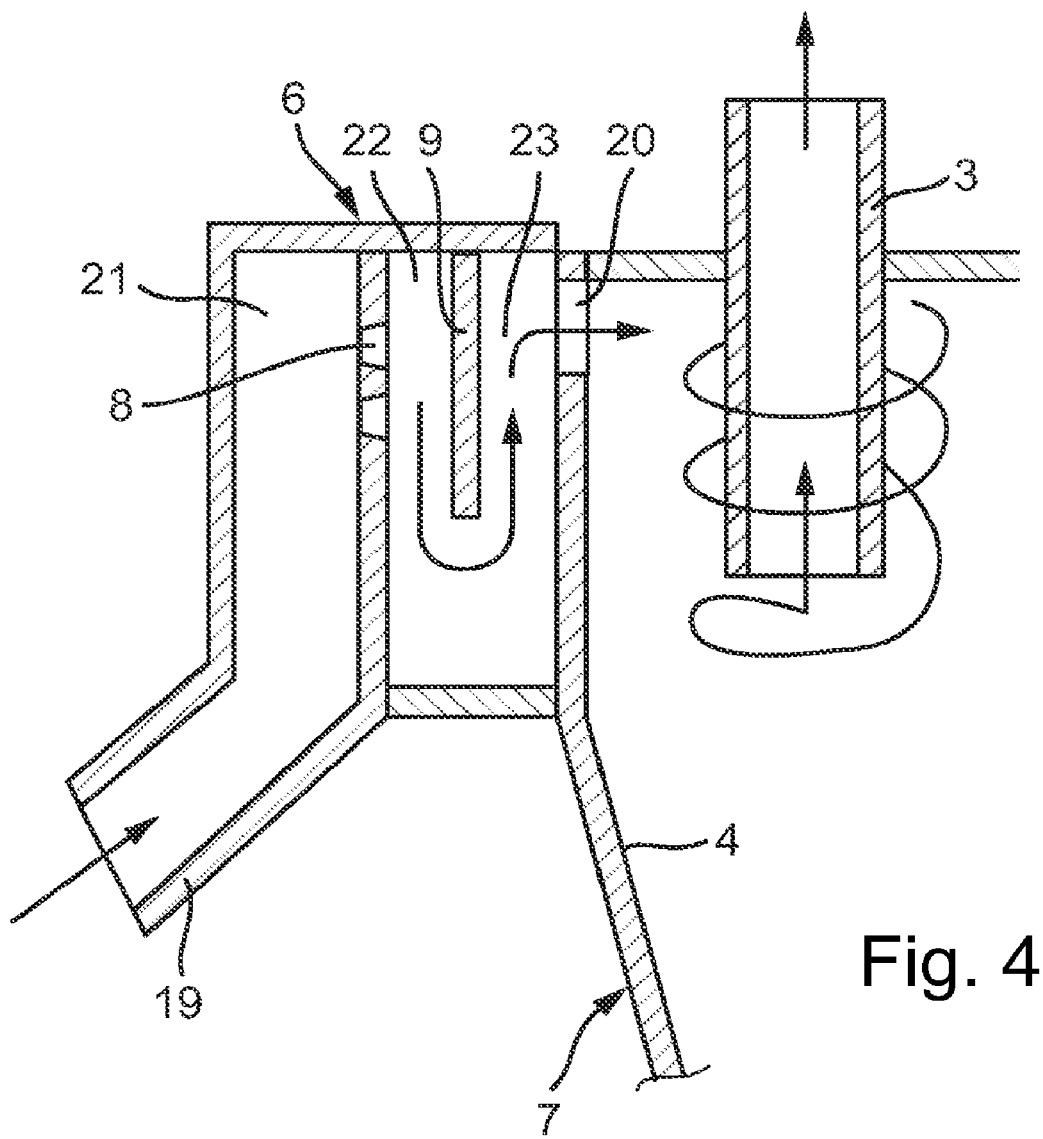

FIGS. 1a, b shows a cyclone in top view and in a longitudinal section,

FIG. 2 shows a longitudinal section through a cyclone-impactor design in a first variant, FIG. 3 shows a cyclone-impactor combination in a second variant, in an illustration according to FIG. 2, FIG. 4 shows a section of a third variant derived from the first variant in an illustration according to FIG. 2.

FIG. 1a, b

A device formed as a cyclone for separation of a gas-liquid mixture has an inlet channel 1 for the mixture, and an outlet channel 2 for separated liquid, and an outlet channel 3 for the gas flow at least partially relieved from liquid parts. The mixture flow flowing into the inlet channel 1 carries out, within the cyclone, a rotational flow at the inner wall 4 of the cyclone. The flow-through in the cyclone is indicated by flow arrows. The inner wall surface 4 of the cyclone formed as separation surface for liquid to be separated is covered with a non-woven fibre layer 5. The non-woven fibre layer 5 consists of plastic fibres with a diameter of about 10-60 μm. The porosity within the non-woven fibre layer 5 is about 80-90%. The thickness of the non-woven layer 5 is dimensioned at about 0.3 to 1.5 mm (according to EN ISDO 9737-2).

While in the drawn exemplary embodiment the entire inner wall surface 4 of the cyclone flown over by the mixture flow is lined with a non-woven fibre layer 5, it can be sufficient or even advantageous to cover either only this entrance region of inner wall surface 4 with the non-woven fibre layer 5, in which the cyclone in its inside is not yet conically reduced, or only the conical region, while the "straight" region remains smooth and without lining for an unrestricted flow.

With a lining by a non-woven fibre 5 of the inner wall surface 4 of a cyclone, completely or only in certain areas, as described above, a substantial increase of the degree of separation is achieved compared to an overall smooth cyclone inner wall surface 4.

FIG. 2

This exemplary embodiment relates to a gas-liquid mixture separation device which consists of a combination of an impactor with a cyclone. Here, in particular the separation surfaces inside the impactor and the cyclone can be formed rough or porous, respectively, that is, covered with a thin, fine-pored knitted fibre or a non-woven fibre, and in fact as embodiments as described in detail, for example, in EP 1 068 890 B1. In the drawn exemplary embodiment, this type of formation of the separation surfaces is not addressed. They are not drawn either. As mentioned above, the respective separation surfaces, however, are to be formed fine-pored, in particular in the mentioned manner.

The separation device consists of a pre-fractionator 6 in the form of a cyclone, and a post-fractionator in the form of an impactor of the type as described, for example, among others, in EP 1 068 890 B1.

Both separators 6, 7 are located in a commonly formed housing, in which individual housing parts equally represent function parts for both fractionators 6, 7.

Figure 1B:
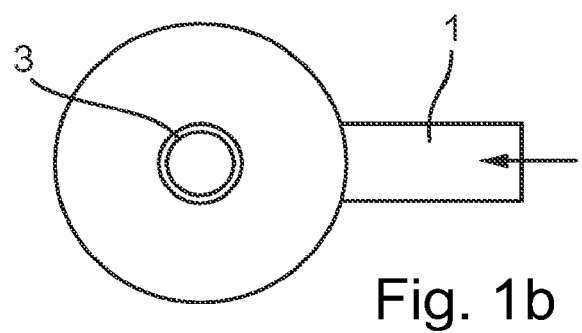

Like the cyclone separator according to FIG. 1, the pre-fractionator formed as a cyclone comprises an inlet channel 1 as well as outlet channels 2, 3 for the gas, on the one hand, and the separated liquid parts on the other hand.

The gas outlet channel 3 of the pre-fractionator 6 includes acceleration nozzles 8 which are directed radially outwards, through which the gas-liquid mixture discharging from the pre-fractionator 6 is guided onto an impactor separation surface 9. By means of a redirection of the flow, at the impactor surface 9, liquid is separated which can flow off through a discharge channel 10. The gas remaining after the liquid separation leaves the post-fractionator 7 through an outlet channel 11.

The flow-through of pre-/post-fractionator combination is indicated by flow arrows.

The discharge channel 10 for the liquid separated in the post-separator 7 leads into the liquid outlet channel 2 of the pre-fractionator 6. In the region in which the discharge channel 10 joins the liquid outlet channel 2 of the pre-fractionator 6, a valve 12 is provided. This valve 12 serves to prevent a short circuit flow from the pre-fractionator 6 through the discharge channel 10 to the outlet channel 11 of the post-fractionator 7. The risk of such a short circuit flow is given in that the separator combination in operation comprises a pressure between the inlet channel 1 and the outlet channel 11, that is, for example, a suction pressure is carried out from the outlet channel 11.

The valve 12, for example, can be formed as a plate valve in the schematically illustrated manner. Here, the formation can be such that the closure body 13, formed as a plate, of the valve 12, causes an open position of the valve 12 in the case that it is subject of gravity only. A closed valve 12 is caused, however, by a pressure drop at opposing sides of the closure body 13 formed as plates, and in particular then, when a pressure drop towards the outlet channel 11 exceeding a specifiable extent exists. With a closed valve 12, during operation of the separation, separated liquid can be retained before the valve 12. In a position or arrangement, respectively, of the liquid reservoir before the valve 12 such that the retained liquid impacts the closure body 13 gravity-driven, the valve 12 will open when the weight of the retained liquid exceeds the closing pressure of the valve 12, which is set pressure-dependent. If the valve 12 is opened by means of the retained liquid, the liquid can flow-off through the valve 12 until the valve 12, due to the low weight of the retained liquid, closes again automatically by means of an operation-related negative pressure applied to this valve towards the outlet channel 11.

The liquid discharge channel 2 also has an outlet-side valve, which is not drawn, for prevention of a short circuit flow of the gas. This valve can be formed in a manner known as per se by a siphon. In addition, the liquid discharge channel 2 can also be led directly into a liquid sump.

FIG. 3

The embodiment according to FIG. 3 corresponds basically to the one of FIG. 2. Unlike the embodiment of FIG. 2, in the one of FIG. 3, a pressure control valve comprising a membrane 14 is integrated in the post-fractionator 7. In the case the separation device of FIG. 1 includes parts and elements which are identical to the ones of FIG. 2, they are indicated with the same reference numbers.

The membrane 14 exposed to the atmosphere is provided in the housing of the post-fractionator 7. This membrane 14 is dedicated to an outlet channel 11 which is modified compared to the embodiment in FIG. 2. Here, this outlet channel 11 is formed as a tube with a L-shaped longitudinal cross section comprising an outlet 15 at the end of the small L-web. Loaded by a pressure spring 16, the exit 15 is kept open by the membrane 14 below a specifiable pressure drop between the interior of the post-fractionator 7 and the atmosphere. If, however, compared to the atmosphere, a negative pressure inside the post-fractionator 7 exceeds a specified threshold value, then the membrane 14 closes pressure-dependent by overcoming the opening force applied by the pressure spring 16.

The membrane 14 is accommodated protected within the housing of the post-fractionator 7, wherein a housing opening 17 establishes the connection to the atmosphere. The combination of the cyclone as a pre-fractionator 6 and of the impactor as the post-fractionator 7 can differ from the shown and described examples with respect to the construction, if an integration of both separators is still realized in one housing. In particular, the function as pre- and post-fractionator 6, 7 also can be reversed between the cyclone and the impactor in a sense that the impactor is formed as pre-fractionator 6 and the cyclone as post-fractionator 7.

FIG. 4

With this embodiment of a separation device, a separation combination exists according to the above mentioned possibility according to which the impactor is formed as the pre-, and the cyclone as the post-fractionator 6, 7. This formation represents an alternative to the embodiment of FIG. 2. Identical elements and parts are hence indicated in both cases with the respective reference numbers.

The difference of the embodiment according to FIG. 4 with respect to the construction is substantially that the impactor in the entrance region of the cyclone is formed as a ring body 18 encompassing the cyclone radially outside. As inlet for a gas-liquid mixture to be separated, serves an intake channel 19 to the pre-fractionator 6, formed as impactor. Coming from the impactor as a pre-fractionator 6, the pre-treated gas mixture enters the cyclone through a housing opening 20. Graphically, only a section is illustrated, since all regions not illustrated are virtually identical with the ones of the embodiment according to FIG. 2. Because of the lack of a top view of this embodiment, it is to be mentioned for reasons of precaution that each of the spaces 21, 22 and 23 of the impactor is a ring space.

All features illustrated in the description and in the following claims can be essential for the invention, individually, as well as combined in any form.

The invention claimed is:

1. A device for separating a gas-liquid mixture, wherein a liquid part is in the form of small particles by separating and coagulating the liquid particles in a separation surface comprising:
   at least one region of an inner wall surface of a cyclone, the separation surface comprised of the at least one region;
   at least one lining applied to the inner wall; and
   a plurality of narrow flow chicanes formed by the at least one lining, wherein at least a portion of the inner wall surface of the cyclone passed by the gas-liquid mixture rotating around a cylinder axis comprises the plurality of narrow flow chicanes,
   wherein the at least one lining is a fibre material that is formed as one of a knitted fibre and a non-woven fibre with fibre thicknesses between about 5 and about 500 μm and a porosity between about 60% and about 90%.

2. The device according to claim 1, wherein the porosity of the fibre material is about 80% to about 90%.

3. The device according to claim 1, wherein the at least one lining is between about 0.05 mm to about 2 mm thick.

4. The device according to claim 1, wherein the fibres of the fibre material are a polymer.

5. The device according to claim 1, wherein the fibre material is formed dual-layered with a wall-adjacent and a wall-remote layer, wherein the wall-adjacent layer has a lower porosity compared to the wall-remote layer.

6. The device according to claim 1 wherein the fibre material is substantially limited to an axial, diameter-constant cyclone entrance region.

7. The device according to claim 1, wherein the fibre material is substantially limited to a conical inner wall region of the cyclone.

8. The device according to claim 1, further comprising at least an inner surface of a cyclone, wherein the separation surface comprises of two partial separation surfaces, a first partial separation surface and a second partial separation surface, wherein one of the first separation surface and the second separation surface is located in a cyclone and the remaining partial separation surface is located in an impactor, wherein the partial separation surface within the impactor is in the form of an impact surface at which the liquid part is created exclusively as a result of redirecting the gas-liquid flow by at least 60 angular degrees caused by an impact, is separated after the impact from a gas flow.

9. The device according to claim 8, wherein the first partial separation surface and the second particle separation surface are arranged in a pre- and a post-fractionator.

10. The device according to claim 9, wherein the pre-fractionator is formed as a cyclone and the post-fractionator is formed as an impactor.

11. The device according to claim 9, wherein the impactor is formed as a pre-fractionator and the cyclone as a post-fractionator.

12. The device according to claim 8, wherein the pre- and post-fractionator are combined in a common housing partially using the same housing regions as functional elements of both the pre-fractionator and the post-fractionator.

13. The device according to claim 10, wherein the post-fractionator in the form of the impactor comprises a tube section for receiving and transferring of the gas-liquid mixture to be separated, wherein
the transfer is carried out at least partially through radial acceleration nozzles to an impact wall arranged concentric to the tube section and dedicated to the impactor as a partial separation surface,
a tube section of a gas discharge channel of the cyclone is formed as a pre-fractionator,
a separate liquid outlet of the pre-fractionator and a separate liquid outlet of the post-fractionator are joined to a common outlet, and
the liquid outlet of the post-fractionator is provided with a valve, which, at a pressure on an outlet side, which is lower compared to the pre-fractionator, is closed when exceeding a specified threshold value, and is open at other pressure conditions.

14. The device according to claim 13, wherein a liquid discharge channel from the impactor includes a region where the liquid discharge channel joins the liquid outlet of the pre-fractionator and a valve is formed, the valve is one of controlled and actuated by a pressure difference, wherein the pressure difference is between the liquid discharge channel and an outlet channel of the device are combined with each other.

15. The device according to claim 14, wherein the valve in a closed state retains a liquid flowing off from the impactor, wherein for a liquid discharge, the weight of the liquid selectively opens the valve against a closing force caused exclusively by a gas pressure difference.

16. The device according to claim 15, wherein the valve is formed as a flap valve including a plate, the plate of functioning as a closure body closing the valve automatically below a specified pressure difference value.

17. The device according to claim 12, wherein the housing comprising the pre-fractionator and the post-fractionator a membrane-actuated pressure control valve is integrated, wherein a membrane is exposed to the pressure difference between a gas-side outlet of the post-fractionator and the atmosphere.

18. The device according to claim 8, in which the cyclone is formed as a pre-fractionator, wherein the gas outlet channel of the cyclone is formed as a tube section for receiving and transferring the gas-liquid mixture to be separated in the impactor as a post-fractionator.

19. The device according to claim 8, in which the impactor is formed as a pre-fractionator, wherein the impactor in the entrance region of the cyclone as a post-fractionator is formed as a ring body and the ring body encompassing the cyclone radially outside.

20. The device according to claim 2, wherein the at least one lining is between about 0.05 mm to about 2 mm thick.

* * * * *